United States Patent [19]
Leitzman et al.

[11] Patent Number: 5,249,652
[45] Date of Patent: Oct. 5, 1993

[54] TWO STAGE DAMPING SHOCK ABSORBER

[75] Inventors: Noel E. Leitzman; Robert J. Selzer, both of Fort Wayne, Ind.

[73] Assignee: Navistar International Transportation Corp., Chicago, Ill.

[21] Appl. No.: 901,452

[22] Filed: Jun. 19, 1992

[51] Int. Cl.$^5$ ................................................ F16F 9/34
[52] U.S. Cl. ..................................... 188/282; 188/317; 188/322.15
[58] Field of Search ............... 188/275, 281, 282, 284, 188/315, 317, 318, 322.15, 322.22, 279, 280

[56] References Cited

U.S. PATENT DOCUMENTS

| | | | |
|---|---|---|---|
| 2,252,772 | 8/1941 | Katcher | 188/275 X |
| 4,503,951 | 3/1985 | Imaizumi | 188/317 X |
| 4,558,767 | 12/1985 | Taylor | 188/322.22 X |
| 4,588,053 | 5/1986 | Foster | 188/275 |
| 4,735,402 | 4/1988 | Davis | 188/322.22 X |
| 4,817,766 | 4/1989 | Nilsson | 188/281 |
| 4,998,592 | 3/1991 | Londt et al. | 180/89.12 |

OTHER PUBLICATIONS

"Gabriel Shock Absorber Design Manual", Gabriel of Canada, Ltd., pp. 5-13.

Primary Examiner—Mark T. Le
Assistant Examiner—Kevin D. Rutherford
Attorney, Agent, or Firm—Dennis K. Sullivan

[57] ABSTRACT

A two-stage shock absorber comprises a casing having a low level damping piston rod therein an end portion of which has two spaced apart flanges thereon with a low resistance fluid path formed therebetween. A floating ring piston is slidingly seated about the piston rod between the flanges and has high resistance throughbores therein. When vibrational forces become excessive to a point where one or the other of the flanges engages against the floating ring piston, the low resistance fluid path is closed off by the floating piston and the high resistance throughbores engage within the fluid flow system to cause a shift from primary low level damping to a high level damping. Once pressure within the system equalizes and the ring piston is no longer in contact with either of the flanges, low level damping resumes.

18 Claims, 2 Drawing Sheets

FIGURE 1
FIGURE 2
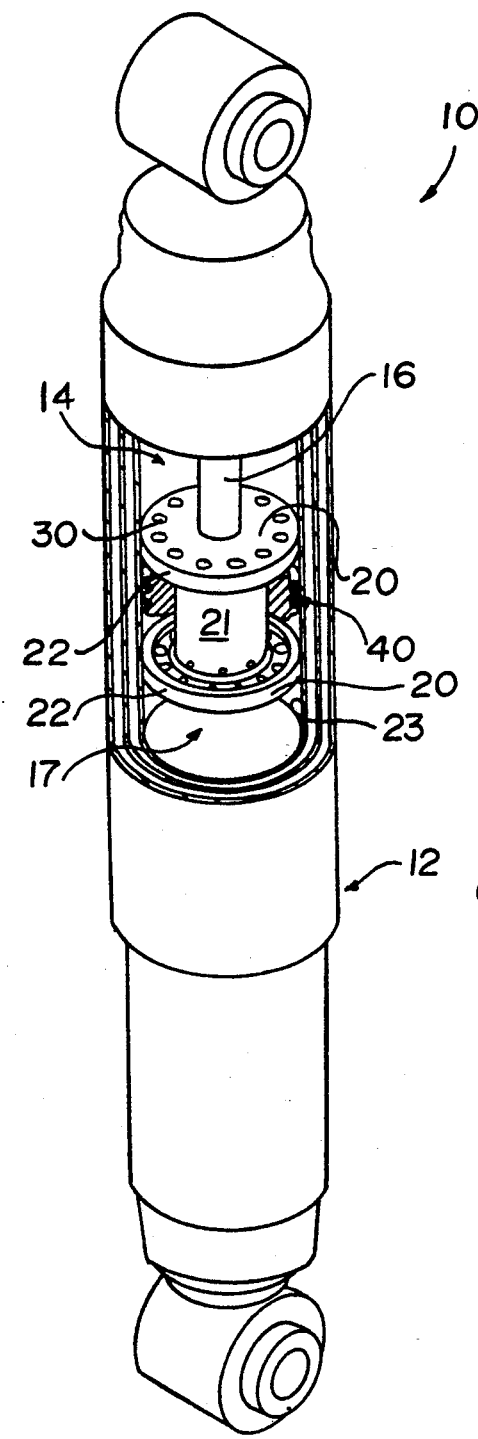
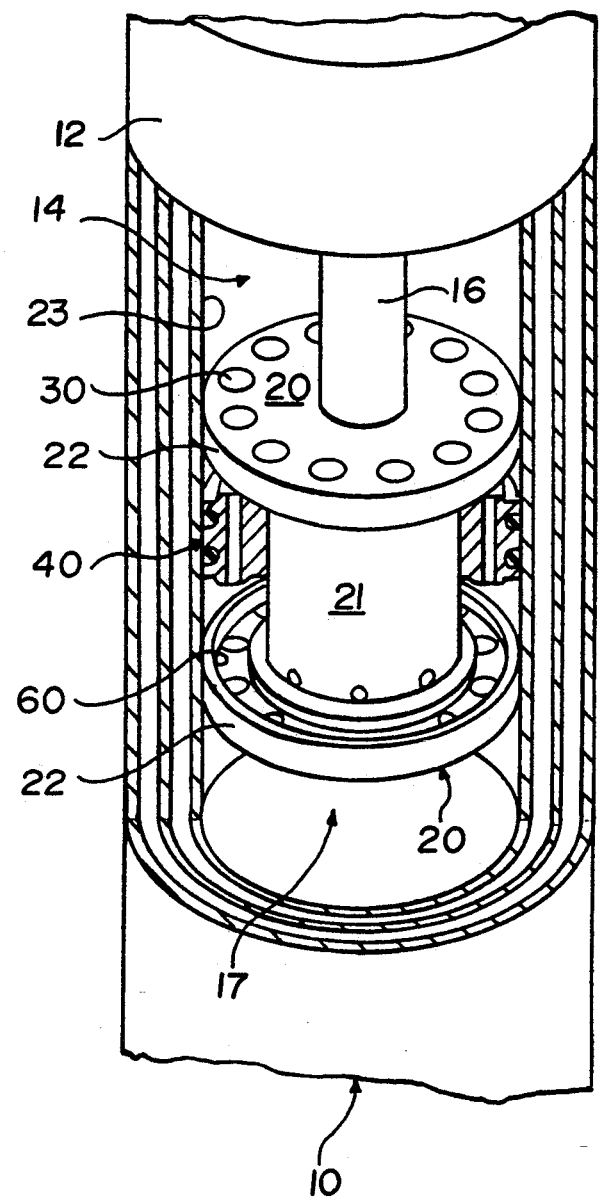

FIGURE 3
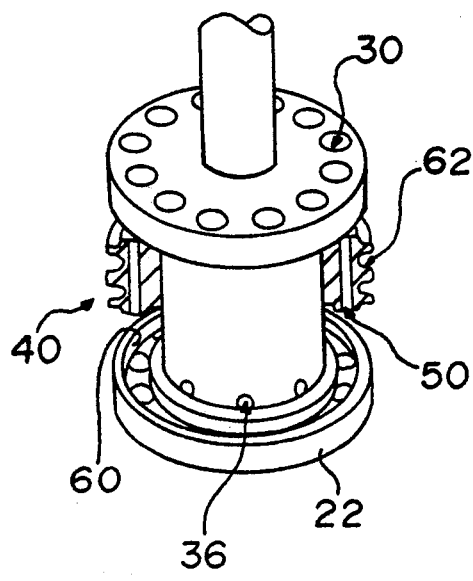
FIGURE 5
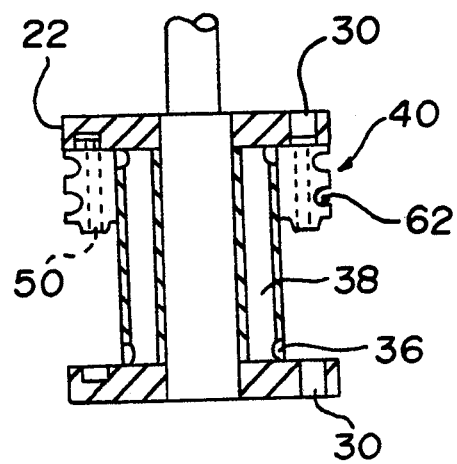
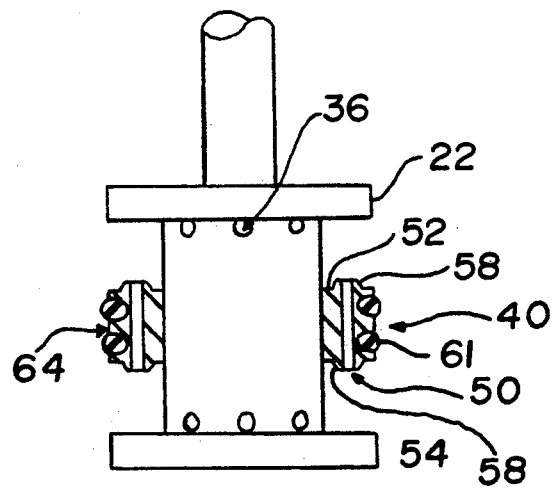
FIGURE 4
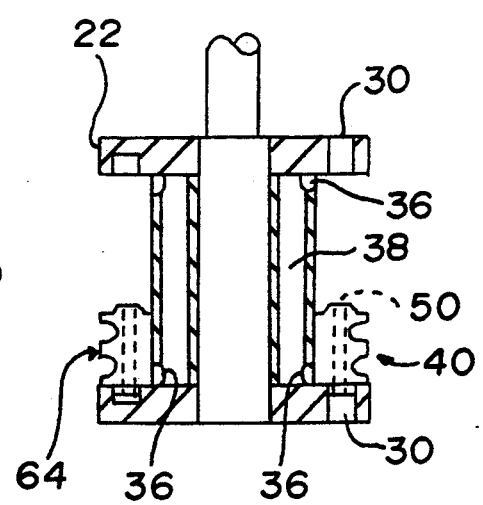
FIGURE 6

TWO STAGE DAMPING SHOCK ABSORBER

BACKGROUND OF THE INVENTION

The present invention relates to a two stage damping shock absorber incorporating structure therein which provides low level damping within preset limits, and, once such preset limits have been exceeded, brings secondary structure providing high level damping into play. Incorporating the two stages within a single shock absorber envelope reduces packaging size, allowing for installation within confined areas.

THE PRIOR ART

U.S. Pat. No. 4,998,592 teaches a passive mechanical damping system for a truck which impedes free movement of a cab of the truck relative to a frame of the truck. Progressive damping of movement of the cab is accomplished by provision of a lost motion connection thereon which provides maximum vibration isolation while providing additional damping to control cab movement when preset displacement limits are exceeded. The system includes a low level viscous damper, a high level viscous damper, and a lost motion connection which also activates the high level viscous damper. Nowhere is there disclosed a two stage, compact shock absorber having low and high level damping capabilities incorporated therein.

SUMMARY OF THE INVENTION

Accordingly, it is an object of the present invention to provide a two stage shock absorber which incorporates structure therein which provides both low and high level damping features.

It is a further object to provide a compact shock absorber envelope incorporating both high and low level damping capability therein, the compact shock absorber reducing dimensional requirements for mounting.

These and other objectives are met by the two stage shock absorber of the present invention which comprises a low level shock absorber having a floating, high level damping element around the piston thereof. The floating element engages against stop members on the piston, blocking a low resistance pathway therein and creating a high resistance pathway; the stop members engaging the floating element only at extremes of travel of the piston, creating a two stage shock absorber wherein high level damping only comes into play when low level damping limits have been exceeded.

BRIEF DESCRIPTION OF THE DRAWINGS

Other objects and advantages of the invention will become more apparent upon perusal of the detailed description thereof and upon inspection of the drawings in which:

FIG. 1 is a perspective view of the shock absorber of the present invention with a center portion of the envelope or casing thereof broken away to show the two stage damping assembly of the present invention therein.

FIG. 2 is an enlarged view of the damping assembly of FIG. 1.

FIG. 3 is a perspective view of the damping assembly with the casing removed.

FIG. 4 is a side view of the damping assembly of FIG. 3.

FIG. 5 is a cross sectional view through the damping assembly showing a sliding piston thereof at its uppermost position on the primary piston rod of the shock absorber.

FIG. 6 is a cross sectional view showing the sliding piston at its lowermost position.

DESCRIPTION OF THE PREFERRED EMBODIMENT

Referring now to the drawings in greater detail, there is illustrated in FIGS. 1-6 a two stage shock absorber 10 made in accordance with the teachings of the present invention.

The shock absorber 10 includes a conventional casing or envelope 12 within which a primary low level damping piston assembly 14 is provided.

The piston assembly 14 includes a piston rod 16 engaged to the envelope 12 in known manner and having a depending end portion 17 which is spool shaped. The end portion 17 has end flanges 20 which extend radially outwardly of a center hub 21 of the end portion 17 and have an end edge 22 which rests against an inner wall 23 of the envelope 12.

Each flange 20 has a circular array of throughbores 30 therein, which are located in the area of the flange 20 extending radially outwardly of the center hub 21.

The center hub 21 also includes low restriction passageways 36 at opposite ends thereof which communicate with a cylindrical center cavity 38 in the hub 21. The passageways 36 are located circumferentially around the hub 21 and are perpendicular to the throughbores 30 in the flanges 20.

Seated slidingly about the center hub 21 and between the flanges 20 is a secondary ring piston 40 which has a circular array of high restriction channels 50 extending through the thickness thereof, the channels 50 being located thereabout in a predetermined manner.

In this respect, when the ring piston 40 seats against either of the end flanges 20, at its uppermost or lowermost extent of travel about the hub 21, the channels 50 therein align with the throughbores 30 in the flanges 20.

The ring piston 40 has on upper and lower surfaces, 52 and 54, respectively, thereof in the circumferential area incorporating the channels 50, a circumferential rib 58 which engages within a corresponding groove 60 in the flange 20 to create a fluid-tight engagement therebetween.

Further, when the ring piston 40 is seated against either end flange 20, the low restriction passageways 36 in the corresponding end of the hub 21 are covered, and all fluid flow is forced through the channels 50 in the ring piston 40 until pressure on either side thereof equalizes.

It will be understood that the pressure differential within the casing 12 is created upon actuation of the shock absorber 10, causing particular patterns of fluid flow therethrough.

In this respect, fluid is shunted through the throughbores 30 in the flanges 20. When such shunting takes place under low pressure, such as over fairly smooth terrain, the fluid passes around the rig piston 40 by entering one set of the low restriction passageways 36, travelling through the center cavity 38 in the hub 21, and exiting via the opposite set of low restriction passageways 36 and corresponding throughbores 30 in the nearer flange 20.

Since the pressure in such a situation is more or less equal to either side of the piston 40, and since the piston 40 is made of a material which frictionally engages against inner wall 23 of the casing 12, the piston 40 remains more or less centered about central hub 21, relative to the flanges 20.

Conversely, when the shock or vibrational factor encountered is significant, fluid shunting takes place at a significantly more forceful and rapid rate, and a suddenly increased pressure differential is produced, one or the other of the end flanges 20 is forced against floating ring piston 40, closing off the corresponding low restriction passageways 36 and forcing fluid entering the abutting throughbores 30 to flow through the high restriction channels 50 within the piston 40, and then through the throughbores 30 in opposite end flange 20.

The high restriction channels 50 are high resistance channels and cause high resistive force to be applied against the fluid when engaged against either of the flanges 20, slowing action of the shock absorber 10 at the extremes of compression and extension, yet allowing the piston rod 16 to center itself at a fairly well paced speed.

Upon reversal of motion of the shock absorber 10, the entire distance to the opposite flange 20 must be travelled before the ring piston 40 has any effect on damping, the ring piston 40 tending eventually to center itself between the flanges 20.

To increase frictional engagement between the piston 40 and the inner wall 23 of the shock absorber casing or envelope 12, thereby increasing the force required to displace same, a plurality of peripheral grooves 62 are cut into an edge surface 64 of the ring piston 40. Within these groove 62, a frictional member 61, such as an O-ring, may be engaged to maintain positioning of the ring piston 40 relative to the inner surface 23 of the casing 1 until it is moved by a force of sufficient strength caused by abutment of one of the end flanges 20 of the piston rod 16 thereagainst.

Thus, so long as vibrational forces encountered do not create abutment between the piston 40 and the flanges 20, the shock absorber 10 remains a low level damper. Conversely, once vibrational forces reach a level where abutment between one of the flanges 20 and the ring piston 40 is caused, the abutment creates a shock absorber 10 capable of high level damping as a second active stage.

As described above, the two stage shock absorber incorporating a floating high level damping ring piston provides a number of advantages, some of which have been described above and others of which are inherent in the invention. Also modifications can be proposed without departing from the teachings herein. Accordingly, the scope of the invention is only to be limited as necessitated by the accompanying claims.

What is claimed is:

1. A two stage shock absorber comprising a shock absorber casing, a rod slidably disposed in said casing and having a piston assembly thereon, said piston providing a low resistance fluid pathway therethrough and further incorporating blocking means slidably disposed in and frictionally engaging said casing and having a range of motion relative to said piston and operatively associated with said piston to close said low resistance fluid pathway when said blocking means is at extremes of said range of motion; said blocking means having a high resistance pathway therein which provides the sole fluid path past said piston assembly when said low resistance pathway is blocked by said blocking means.

2. The shock absorber of claim 1 wherein said piston assembly has two spaced apart flanges on a piston rod thereof, said flanges having low resistance fluid passages therein.

3. The shock absorber of claim 2 wherein said low resistance fluid pathway comprises said piston rod having a cylindrical cavity therein with ports leading thereto lying between and adjacent said flanges and perpendicular thereto.

4. The shock absorber of claim 3 wherein said blocking means comprises a ring piston slidably engaged about said rod between said flanges.

5. The shock absorber of claim 4 wherein said ring piston has high resistance passages therein which engage said low resistance passages in said flanges when seated thereagainst.

6. The shock absorber of claim 5 wherein said ring piston seals said ports leading to said cylindrical rod cavity when said ring piston being disposed adjacent a flange.

7. A two stage shock absorber comprising a shock absorber housing incorporating therein a low level damping piston assembly having a low resistance fluid path therethrough and having two spaced apart flanges on a rod of said piston; and a secondary ring piston slidingly seated about said low level damping piston assembly and having high resistance fluid pathways therethrough; said secondary ring piston closing off said low resistance path through said piston assembly and establishing communication through said high resistance pathways upon being disposed adjacent an end flange of said piston, said ring piston being frictionally biased against an inner wall of said housing so that engagement against one of said flanges only occurs at extremes of travel of said low level damping piston assembly relative to said ring piston.

8. The shock absorber of claim 7 wherein said ring piston includes circumferential grooves therein within which frictional members are engaged to lie between said ring piston and said inner wall of said housing.

9. The shock absorber of claim 8 wherein said ring piston has a peripheral rib on an upper and a lower surface thereof, each of said ribs engaging a cooperating groove in a corresponding piston assembly end flange.

10. The shock absorber of claim 9 wherein low resistance fluid channels are provided within each flange and empty into said groove.

11. The shock absorber of claim 10 wherein said high resistance pathways in said ring piston extend from rib to rib.

12. The shock absorber of claim 11 wherein said high resistance pathways within said ring piston engage within said groove in said flange.

13. The shock absorber of claim 7 wherein said ring piston has a center opening therethrough within which a rod of said piston is slidably received.

14. The shock absorber of claim 13 wherein said rod includes a cylindrical cavity therein with openings thereto lying adjacent each flange.

15. The shock absorber of claim 14 wherein said ring piston is disposed to seal corresponding openings into the cylindrical cavity when said ring piston is disposed adjacent either of said flanges.

16. The shock absorber of claim 14 wherein said ring piston high resistance pathways are bypassed via said cylindrical cavity when openings to said cylindrical cavity are unsealed.

17. The shock absorber of claim 7 wherein said ring piston is made of a frictional material.

18. The shock absorber of claim 7 wherein said high resistance pathways in said ring piston form a continuation of said low resistance fluid channels in one of said flanges when said flange engages against said ring piston.

* * * * *